(12) United States Patent
Bell et al.

(10) Patent No.: US 7,355,347 B1
(45) Date of Patent: Apr. 8, 2008

(54) AUXILIARY LIGHTING SYSTEM FOR VEHICLES

(75) Inventors: Joseph A. Bell, Markle, IN (US); Matthew J. T. Gumbel, Fort Wayne, IN (US); Scott T. Hepler, Spencerville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/548,542

(22) Filed: Oct. 11, 2006

(51) Int. Cl.
*B60Q 1/26* (2006.01)

(52) U.S. Cl. .................... 315/80; 77/82; 340/431; 340/468; 340/472; 307/10.8

(58) Field of Classification Search .......... 315/77, 315/80, 82; 340/468, 471, 472, 475, 478, 340/479, 426.14, 431; 701/1, 2, 33, 36; 307/10.8, 307/10.1; 362/543, 499
See application file for complete search history.

(56) References Cited

U.S. PATENT DOCUMENTS

| 4,277,819 | A | * | 7/1981 | Sobota et al. ............... 362/545 |
| 5,434,553 | A | | 7/1995 | Rhodes |
| 5,644,290 | A | | 7/1997 | Rhodes |
| 5,770,999 | A | | 6/1998 | Rhodes |
| 6,265,829 | B1 | * | 7/2001 | Perdec ........................ 315/82 |
| 6,272,402 | B1 | | 8/2001 | Kelwaski |
| 6,690,140 | B2 | * | 2/2004 | Larson ....................... 320/104 |
| 2006/0187078 | A1 | * | 8/2006 | Bell et al. ................ 340/815.4 |

* cited by examiner

*Primary Examiner*—Haissa Philogene
(74) *Attorney, Agent, or Firm*—Jeffrey P. Calfa; Gerald W. Askew

(57) ABSTRACT

A vehicle lighting system has primary and auxiliary systems, which operate exclusively depending upon the selected operational mode. The problem addressed is availability of civilian vehicles for alternative operations including military operations, where the conventional lighting system cannot be used. The control arrangement mimics contemporary military systems, while meeting all military requirements.

10 Claims, 3 Drawing Sheets

AUXILIARY LIGHTING SYSTEM FOR VEHICLES

BACKGROUND OF THE INVENTION

1. Technical Field

The present invention relates to vehicle lighting systems and more particularly to providing both civilian and military style black-out lighting systems on a vehicle.

2. Description of the Problem

U.S. Pat. No. 6,272,402, which is assigned to the assignee of the present application, described an electrical control system for a vehicle having a plurality of electrical loads. Generic controllers, termed in the patent "remote interface modules", were provided for the control and energization of non-standard devices installed on the vehicle, such as motors driving pumps for hydraulic lifts. An electronic system controller (ESC) managed the remote interface modules over a serial communication link to implement the specialized functionality. Each remote interface module (RIM) was constructed as a standard component capable of providing digital and analog outputs to devices attached to one or more output ports on the module. The remote power modules employed in the present application are closely related devices to the RIM units described in the '402 patent.

Of interest here is equipping vehicles for both civilian duty and alternative service, such as military use, where different lighting systems are required. Military, some emergency and police vehicles typically provide specialized lighting systems to meet the requirements of the service to which they are put. Under some circumstances it may be necessary to press civilian vehicles into such specialized service, in which case, the ability of the vehicle to at least mimic the required lighting system without modification of the vehicle would be valuable.

The specialized lighting system of most interest is a blackout lighting system conforming to NATO standards. Blackout lighting provides minimal lighting allowing the vehicles to see and be seen in convoy operation, to allow drivers to accurately set a proscribed distance (keep station) between their vehicle and the vehicle directly in front of them and to indicate brake engagement. In addition, limited headlamps are provided in case a particular vehicle is the lead vehicle of the convoy. For vehicles hauling military type trailers, it may be required that the vehicle provide power to the trailer at a different voltage than is used by the vehicle.

SUMMARY OF THE INVENTION

According to the invention there is provided a dual mode vehicle lighting system. The vehicle lighting system includes a plurality of lamps divided among a primary lighting system and an auxiliary lighting system. A primary system controller has a plurality of lamp energization ports connected to lamps in the primary lighting system. An auxiliary controller has a plurality of lamp energization ports connected to lamps in the auxiliary lighting system. Control inputs are provided to the primary system controller for actuating individual lamps of both the primary lighting system and the auxiliary lighting system. A mode switch for selecting an operational mode is also connected to the primary system controller. The modes are exclusive in that the lamps of the primary lighting system work exclusively to those in the auxiliary lighting system in the primary mode and vice versa for the auxiliary mode. The mode switch is connected to be energized by the auxiliary controller which is active even when the ignition is off. A confirmation switch is connected between a source of power and the auxiliary controller. Any change of mode between auxiliary and primary operation indicated by operation of the mode switch requires operation of the confirmation switch. A two-way communication link is provided between the primary controller and the auxiliary controller. The auxiliary controller provides a signal to the primary controller over the two-way communication link indicating operation of the confirmation switch. The primary controller provides signals to the auxiliary controller over the two-way communication link responsive to control inputs requesting operation of particular lamps in the auxiliary lighting system when the system is in auxiliary operation mode.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
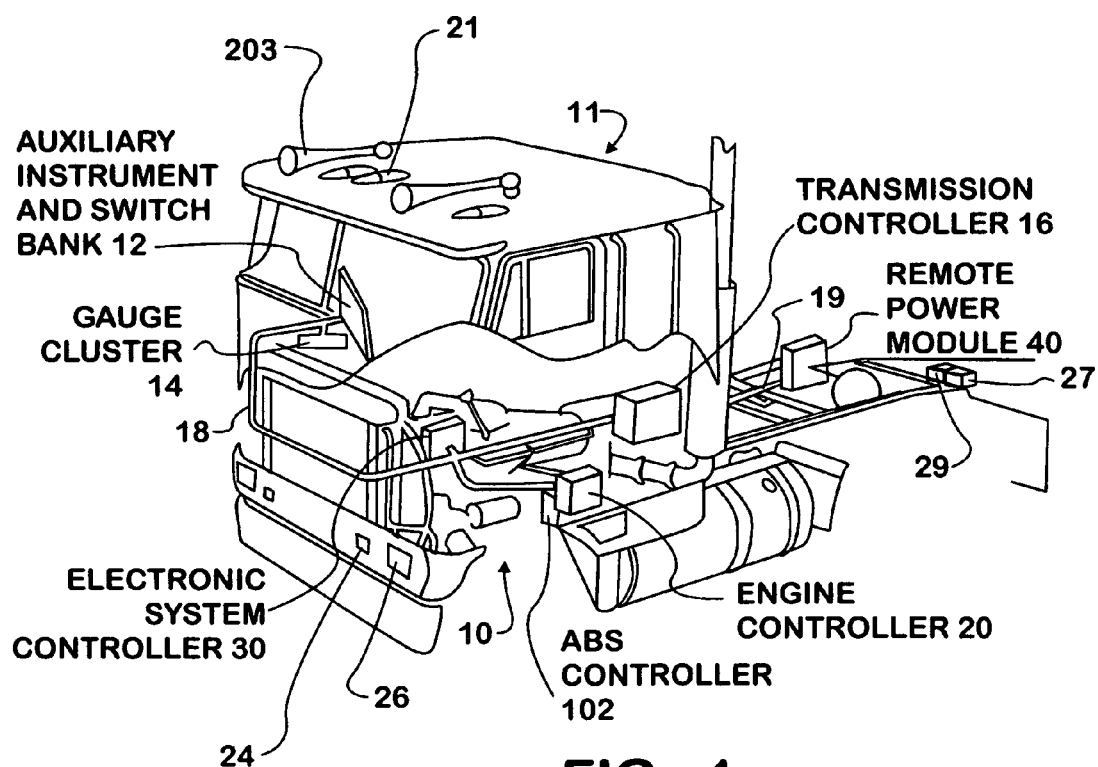
FIG. 1 is a perspective view in partial cutaway of truck tractor equipped with dual lighting systems.

Referring to the drawings, FIG. 1 is a perspective view of a vehicle electrical system 10 installed on a vehicle 11. Vehicle electrical system 10 is based on an electronic system controller (ESC) 30, a first controller area network bus 18 and a second controller area network bus 19. ESC 30 communicates with vocational controllers disposed on vehicle 11, which include a gauge cluster 14, an engine controller 20, a transmission controller 16, an auxiliary instrument and switch bank 12, and an antilock brake system (ABS) controller 102, all of which are connected to the first CAN bus 18 and a remote power module 40 connected to the second, proprietary CAN bus 19. Remote power module 40 is similar in concept to the remote interface module described in the '402 patent described above, but the vehicle electrical architecture places it on CAN bus 19 rather than a public bus. ESC 30 operates as a bridge between the busses 18, 19. There are special circumstances when signals generated by a vocational controller have relevance to the operation of the RPM 40, for example, the activation of back up lights in response to indication from the transmission controller 16 that "reverse" has been selected. RPM 40 provides electrical power for black out lights 24, 27, 29. Both busses are serial data links, based on a twisted pair cable and operated in accordance with SAE standard J1939.

Gauge cluster 14, transmission controller 16 and engine controller 20 all communicate with electronic system controller 30, which also monitors inputs received from the auxiliary instrument and switch bank 12, over bus 18. Electronic system controller 30 is programmed to execute requests from these controllers, including requests for lighting from the gauge cluster 14 and transmission controller 16.

Normal or primary lighting system functions include operation of the headlights 26 (including hi-beam, low-beam, flash to pass and daytime-running light operation). Additional elements of the conventional, civilian lighting systems (and related components) include running lights 21, reverse lights, brake lights, turn signals, 4-way flashers, air and electric horns 203, fog lights, work lights, a dome light (automatic switch) and trailer lighting relays (grouped conventional lights-first group 211 and horn 203). In blackout or auxiliary lighting system operation many of the elements of the primary lighting system are disabled. A few lights of the primary system operate in black out operation, including panel illumination in response to the headlight switch being in the park or headlight position (as indicated by the gauge controller 14), switch pack green ON indicators, cluster warning lights and the dome light when activated using a manual switch (conventional lights-second group 213). The requests for these lights can come from various sources, typically switches connected to the ESC 30 or gauge controller 14. In the case of the cluster lights the control signals come from the engine controller 20. In addition, a brake pedal position indicating switch connected to the ESC 30 provides a request signal for brake lights.

Figure 2:
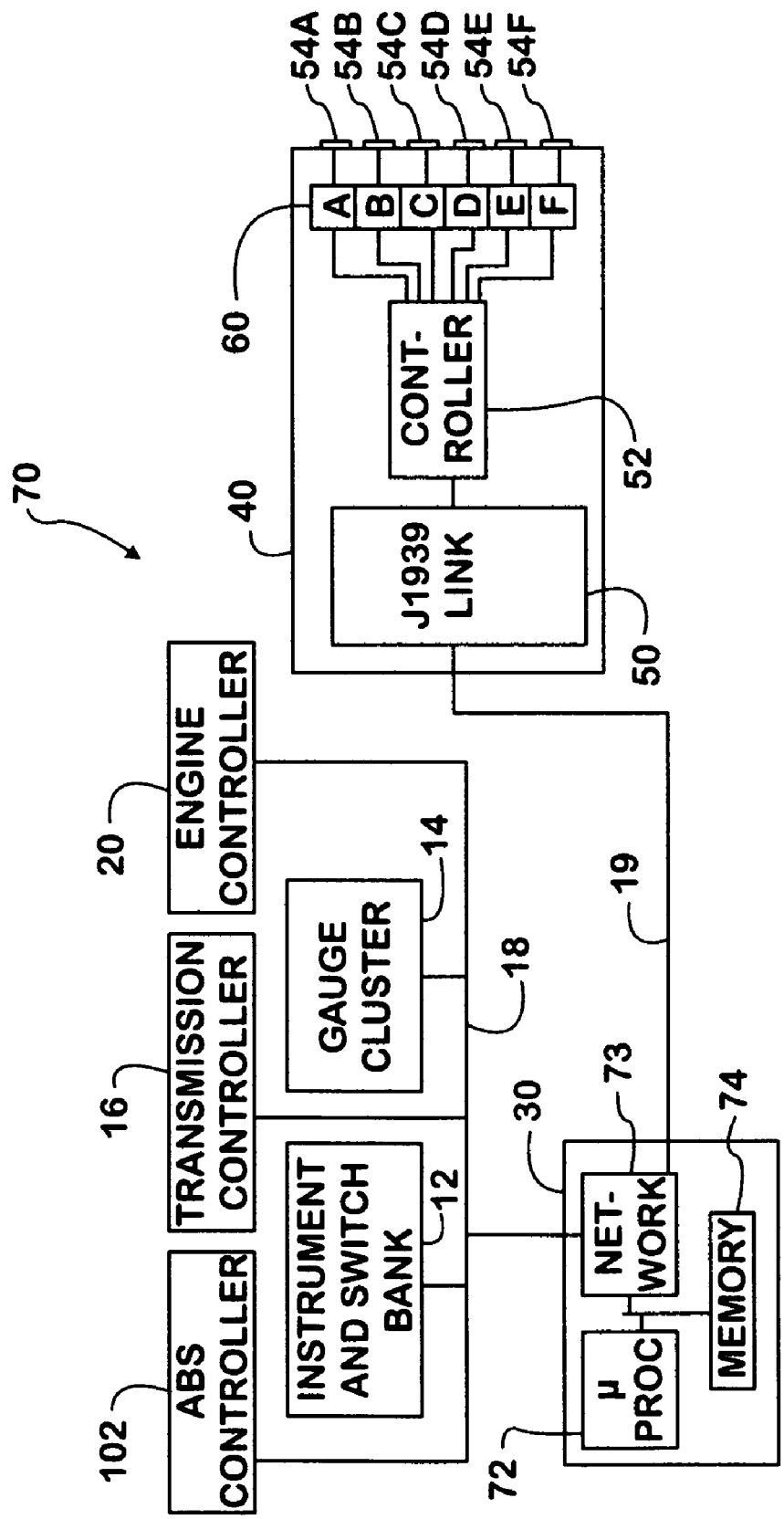
FIG. 2 is a high level schematic illustration of an electrical control system for a motor vehicle.

FIG. 2 is a high level schematic illustration of a system network 70 implemented within vehicle electrical system 10. System network 70 includes a microprocessor 72 based electrical system controller (ESC) 30. Microprocessor 72 executes programs stored in memory 74 and the program selected for execution can depend upon external inputs. Memory 74 is constructed in a conventional manner and includes volatile and non-volatile sections, the latter of which is preferably fabricated from flash technology electrically erasable programmable read-only memory (EE-PROM). A network interface 73 implements J1939 communications over the serial communication links (i.e. CAN busses 18, 19).

RPM 40 comprises a J1939 interface link 50. RPM 40 further includes a micro-controller 71 which can, under the direction of appropriate inputs mimic various circuit and logic elements, such as oscillators, buffers, analog to digital converters, feed back loops, et cetera. Here however microcontroller 52 has the simpler task of providing switching signals for turning on and off a set of six output ports 54A-F by controlling the conductive state of six FET switches 60A-F. J1939 link 50 handles communications tasks defined by the J1939 standard over private CAN bus 19. ESC 30 determines output states for RPM based on inputs from the ESC 30 and an activation switch 200.

Figure 3:
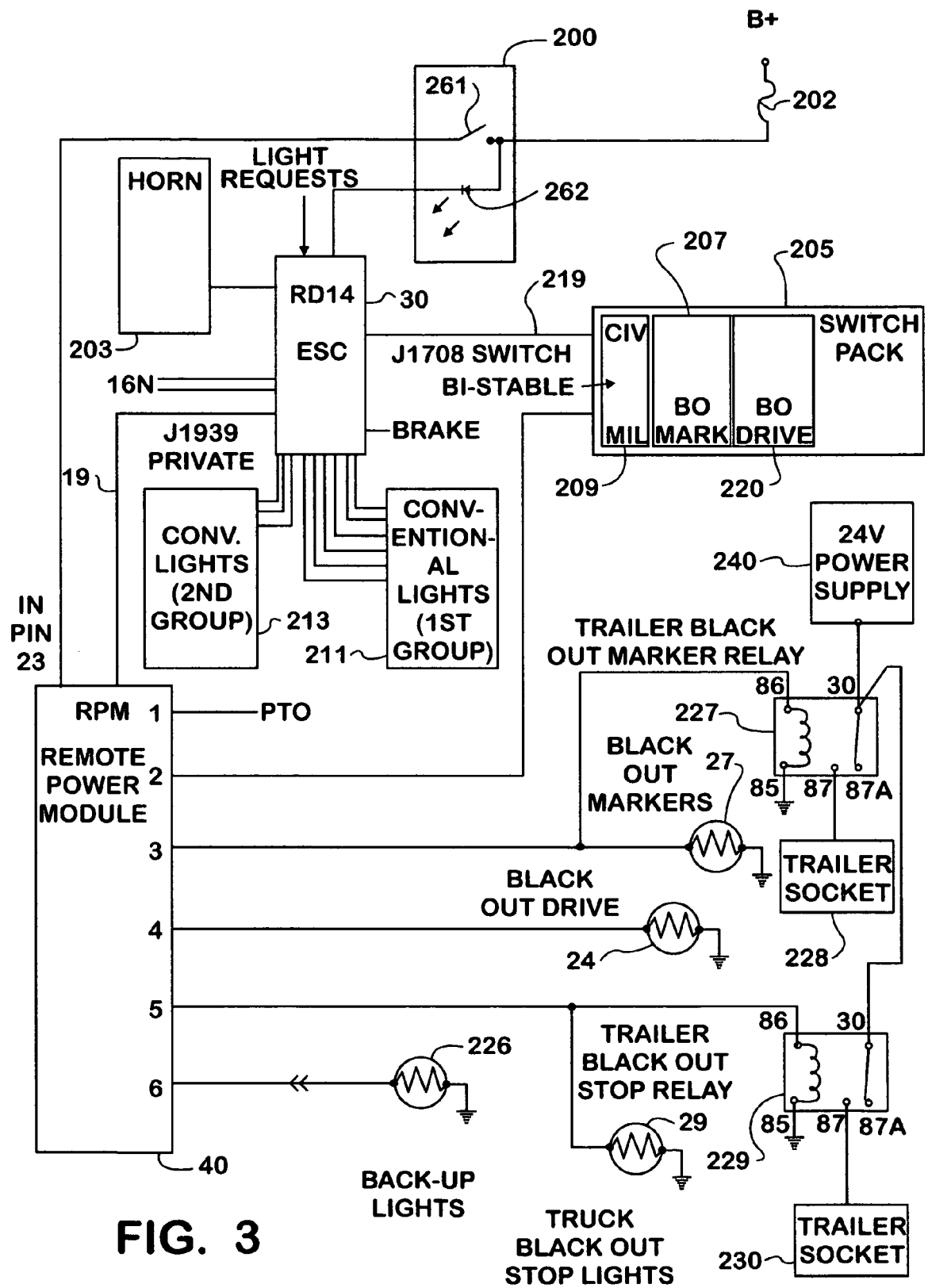
FIG. 3 is a high level schematic of control arrangement for dual light systems for a motor vehicle.

Referring more particularly to FIG. 3, a preferred embodiment of the invention adapted to provide military style black out lighting control is described. An electrical system controller (ESC) 30 receives conventional light requests, typically over the public J1939 bus 18, from a number of sources, including particularly the gauge controller/cluster 14 and the transmission controller 16. The transmission controller 16 provides status signals indicating a selection of a gear. An indication that the transmission is in reverse is treated as a request for illumination of back-up lights 226. The requests for lights (including signals treated as a request for lights) coming over the public J1939 bus 18 and other direct inputs to ESC 30 are grouped as "Light Requests" and shown as an Input into ESC 30. These inputs may be taken as including requests for the horn 203. In addition, requests may come from other sources, such as a brake pedal position switch directly to the ESC 30. Operation of lights may be contingent on the position of the Ignition switch IGN in one of four positions: OFF, ON, start or crank indicated over two inputs 16N to the ESC 30. ESC 30 includes FET switches by which the horn 203, and the first and second groups of conventional lights 211, 213 are activated.

RPM 40 provides electrical signals for the illumination of black out drive lights 24, black out marker lights 27 and black out stop lights 29. In addition, it provides power to a black out control switch pack 205 and the activation signal for the conventional back up lights 226. Finally, one output from RPM 40 is illustrated as used for a power take off application to emphasize that the RPM 40 is still available up to the limit of its pin outputs for application to other tasks. The black out rear marker lights 27 and black out stop lights 29 will be duplicated on any trailer that vehicle 11 is used to tow and accordingly the activation signals for these lights are used to power relays 227 and 229, respectively, for connecting a 24 volt power supply 240 to trailer sockets 228 and 230, which are in turn connected to the appropriate lights mounted on a trailer. Relays are used because it is anticipated that vehicle 11 will operate on a conventional civilian 12 volt system for lighting, while the trailer will use 24 volts. The vehicle is equipped with a parallel 24 volt power supply 240 to enable this feature if needed. No trailer socket is needed for black out drive lights 24 since drive lights are unlikely to ever be needed on a towed trailer.

It is a requirement of the system that it be able to enter military mode without moving the ignition IGN from its off position. RPM 40 is energized even when the ignition IGN is in its off position. Upon moving the civilian to military bistable toggle switch 209 in switch pack 205 to "off" or "military", a signal is raised on the ESC 30 over a J1708 bus 219. This signal requires confirmation. The confirmation signal source is a confirmation switch 200 which includes a switch 261 and an indication light emitting diode 262. Basically, LED 262 is connected by a current limiting protection element 202 to battery and to an input of ESC 30. In response to a request for military mode received over the J1708 bus 219, the pin to which LED 262 is connected on ESC 30 is pulled low and the LED begins to glow. This is a signal to confirm the request by closing switch 261, which provides an enable/confirmation signal to RPM 40. RPM 40 in turn notifies ESC 30 of receipt of the confirmation signal over J1939 private bus 19. In response ESC 30 disables activation of the conventional lighting system of the first group 211 and the horn 203. Confirmation may also be required to switch out of military mode back to civilian mode. In civilian mode the black out lights do not operate. The confirmation switch 261 is active for a limited period after operation of one of the switches of switch pack 205.

The lights in the black out group controlled by RPM 40 fall into two groups, those activated automatically by driver actions, i.e. the black out stop lights 29, and those activated by deliberate driver action, i.e. the black out marker lights 27 and the black out drive lights 24. Switches 220 and 207 are provided in switch pack 205 to provide control over the black out marker lights 27 and the black out drive lights 24, respectively. Black out stop lights are activated by RPM 40 in response to a request received by the RPM 40 received over J1939 private bus 19 from ESC 30, which is generated there in response to a brake position signal. Similarly, ESC 30 provides commands for illumination of drive and marker lights based on signal states it receives over the J1708 bus based on the positions of switches 220 and 207, respectively. Operation of the selectable black out lights, i.e. the drive and marker lights, requires use of the confirmation switch 261 as set out above before the operation is carried out. The confirmation switch effectively operates as the "enter" switch in military style lighting control arrangements.

Back up lights 226 are the vehicle's conventional, civilian style lights, activated in response to operation of the transmission and request from the transmission controller passed by the ESC 30 to the J1939 private bus 19. In military mode ESC 30 simply stops passing on the requests and the back up lights are not activated in response to transmission operation. The back up lights 226 are operated from the RPM 30 because in the assignee's conventional truck designs these lights were actuated in response to transmission status signals from the transmission controller. In the preferred embodiment of the present invention RPM 40 had an open output pin while ESC 30 had none available for lights. It was a simple matter to adapt the confirmation signal of brake light operation from the transmission controller to the ESC as a private back up light request signal, which could be bridged by the ESC 30 to the J1939 private bus 19 for operation on by the RPM 40.

The invention provides a greatly simplified black out lighting system installed as an auxiliary lighting system on a conventional vehicle. Effective disablement of the system may be effected by removal of the switch pack 205 from the vehicle. The civilian military toggle 209 may be implemented as a key switch to prevent capricious use of the system.

While the invention is shown in only one of its forms, it is not thus limited but is susceptible to various changes and modifications without departing from the spirit and scope of the invention.

What is claimed is:

1. A vehicle comprising:
a plurality of lamps some of which are operable as part of a primary lighting system and some of which are operable as part of an auxiliary lighting system;
a system controller having a plurality of lamp energization ports connected to lamps of the primary lighting system;
an auxiliary controller having a plurality of lamp energization ports connected to lamps of the auxiliary lighting system;
control inputs into the system controller for actuating individual lamps of both the primary lighting system and the auxiliary lighting system and including a mode switch for selecting an operational mode in which the lamps of the primary lighting system work exclusively to those in the auxiliary lighting system work, or vice versa; and
the mode switch being energized by the auxiliary controller.

2. A vehicle as claimed in claim 1, further comprising:
a confirmation switch connected between a source of power and the auxiliary controller; and
any change of mode between auxiliary and primary operation indicated by a change in the mode switch requiring operation of the confirmation switch for execution.

3. A vehicle as claimed in claim 2, further comprising:
a two-way communication link between the primary controller and the auxiliary controller; and
the auxiliary controller providing a signal to the primary controller over the two-way communication link for indicating operation of the confirmation switch; and
the primary controller providing signals to the auxiliary controller over the two-way communication link responsive to control inputs for requesting operation of particular lamps in the auxiliary lighting system when the system is in auxiliary operation mode.

4. A vehicle as claimed in claim 3, wherein the auxiliary lighting system is a black out lighting system.

5. A vehicle as claimed in claim 4, further comprising:
relays responsive to control outputs from the auxiliary controller for operating lamps in the black out lighting system for supplying power at a different voltage level to trailer electrical connections.

6. A vehicle lighting system having first and second operational modes, the vehicle lighting system comprising:
a plurality of lamps including a primary group of lamps operable in the first mode and an auxiliary group of lamps operable in the second mode;
mutually exclusive primary and auxiliary sets of switches connected respectively to energization circuits for the primary and auxiliary groups of lamps;
a mode select switch;
a controller responsive to control inputs and to a current operational mode and operationally coupled to the primary and auxiliary sets of switches for turning on and off switches in a particular set, the controller being further connected to the mode select switch and responsive thereto for selecting which of the primary and auxiliary sets of switches is active; and
a confirmation switch connected to become active in response to actuation of the mode select switch, the controller being further responsive to the confirmation switch before changing operational modes.

7. A vehicle lighting system having first and second operational modes as set forth in claim 6, the vehicle lighting system further comprising:
a remote power module connected to communicate with the controller over a communication link, a plurality of the switches, including all of the switches of the auxiliary set, being located on the remote power module;
the confirmation switch being connected between a power source and the remote power module, which indicates to the controller operation of the confirmation switch; and
the remote power module being connected to supply power to the mode select switch.

8. A vehicle lighting system having first and second operational modes as set forth in claim 7, the vehicle lighting system further comprising:
a power level switching relay connected to one of the switches associated with the auxiliary set of switches.

9. A vehicle lighting system having first and second operational modes as set forth in claim 8, wherein the auxiliary group of lamps are black out system lamps.

10. A vehicle lighting system having first and second operational modes as set forth in claim 9, the vehicle lighting system further comprising:
a plurality of lamps operable in either the first or second operational modes.

* * * * *